United States Patent
Pescod et al.

(10) Patent No.: US 9,884,689 B2
(45) Date of Patent: Feb. 6, 2018

(54) DATA RETRIEVAL SYSTEM IN AN AIRCRAFT WITH DATA STORED DURING A FLIGHT AND WIRELESSLY TRANSMITTED TO A GROUND SYSTEM AFTER LANDING USING A TRANSMISSION ELEMENT IN AN EXTERNAL PANEL OF AN AVIONIC BAY

(71) Applicant: BAE SYSTEMS plc, London (GB)

(72) Inventors: Christopher Ralph Pescod, Chelmsford (GB); Lydia Ann Hyde, Chelmsford (GB); Shahbaz Nawaz, Chelmsford (GB); Shaun William Waddington, Preson (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 14/892,989

(22) PCT Filed: May 21, 2014

(86) PCT No.: PCT/GB2014/051548
§ 371 (c)(1),
(2) Date: Nov. 20, 2015

(87) PCT Pub. No.: WO2014/188179
PCT Pub. Date: Nov. 27, 2014

(65) Prior Publication Data
US 2016/0114902 A1  Apr. 28, 2016

(30) Foreign Application Priority Data

May 23, 2013 (EP) .................................... 13250060
May 23, 2013 (GB) .................................... 1309296.0

(51) Int. Cl.
*H04Q 7/20* (2006.01)
*B64D 45/00* (2006.01)
(Continued)

(52) U.S. Cl.
CPC ............... *B64D 45/00* (2013.01); *H04B 1/04* (2013.01); *H04B 1/3822* (2013.01); *H04B 7/18506* (2013.01); *B64D 2045/0065* (2013.01)

(58) Field of Classification Search
CPC .. B64D 45/00; B64D 2045/0065; H04B 1/04; H04B 1/3822; H04B 7/18506
See application file for complete search history.

(56) References Cited

U.S. PATENT DOCUMENTS

| | | |
|---|---|---|
| 5,231,409 A | 7/1993 | Astier et al. |
| 5,670,742 A | 9/1997 | Jones |

(Continued)

FOREIGN PATENT DOCUMENTS

| | | |
|---|---|---|
| DE | 102005061336 A1 | 6/2007 |
| WO | 0007126 | 2/2000 |

(Continued)

OTHER PUBLICATIONS

International Search Report and Written Opinion received for Patent Application No. PCT/GB2014/051548, dated Jul. 17, 2014. 9 pages.

(Continued)

*Primary Examiner* — Nguyen Vo
(74) *Attorney, Agent, or Firm* — Finch & Maloney PLLC

(57) ABSTRACT

An aircraft-side aircraft data retrieval system and method, comprising: a data storage device (14) located in an aircraft (2) adapted to, during a flight, store data acquired during the flight; a transmission element (50), for example a dielectric filled hole or a coaxial transmission line assembly, in an external panel (9) of the aircraft (2); and wireless apparatus (18) adapted to wirelessly transmit, after the aircraft (2) has landed, the stored data to a ground-side data retrieval system (6) via the transmission element (50).

17 Claims, 4 Drawing Sheets

(51) Int. Cl.
*H04B 7/185* (2006.01)
*H04B 1/04* (2006.01)
*H04B 1/3822* (2015.01)

(56) References Cited

U.S. PATENT DOCUMENTS

| | | | |
|---|---|---|---|
| 5,739,786 A | 4/1998 | Greenspan et al. | |
| 5,783,772 A | 7/1998 | Takahashi et al. | |
| 6,025,795 A | 2/2000 | Hulderman et al. | |
| 6,154,637 A | 11/2000 | Wright et al. | |
| 6,181,990 B1 | 1/2001 | Grabowsky et al. | |
| 6,536,711 B1* | 3/2003 | Conway, Jr. | B64C 3/48 244/129.5 |
| 6,781,968 B1 | 8/2004 | Colella et al. | |
| 6,876,905 B2 | 4/2005 | Farley et al. | |
| 6,898,492 B2 | 5/2005 | de Leon et al. | |
| 7,835,734 B2 | 11/2010 | Eckert et al. | |
| 7,973,722 B1 | 7/2011 | Hill et al. | |
| 2003/0037604 A1* | 2/2003 | Poblete | G01M 3/32 73/73 |
| 2003/0130769 A1 | 7/2003 | Farley et al. | |
| 2004/0008253 A1 | 1/2004 | Monroe | |
| 2004/0027255 A1 | 2/2004 | Greenbaum | |
| 2005/0156803 A1* | 7/2005 | Soler Castany | H01Q 1/246 343/770 |
| 2006/0276943 A1* | 12/2006 | Anderson | G07C 5/0858 701/33.4 |
| 2007/0072639 A1 | 3/2007 | Frost et al. | |
| 2009/0179811 A1* | 7/2009 | Chou | H01Q 9/045 343/787 |
| 2010/0267375 A1 | 10/2010 | Lemmon et al. | |
| 2011/0095951 A1* | 4/2011 | McCarthy | H01Q 1/28 343/705 |
| 2011/0257834 A1 | 10/2011 | Hebb | |
| 2011/0284683 A1 | 11/2011 | Liu | |
| 2012/0191273 A1 | 7/2012 | Jacobs et al. | |
| 2012/0285132 A1 | 11/2012 | Rebeyrotte et al. | |
| 2013/0083960 A1 | 4/2013 | Kostrzewski et al. | |
| 2014/0210165 A1* | 7/2014 | Gleason | F16J 15/061 277/312 |
| 2016/0049019 A1 | 2/2016 | Mahalingaiah et al. | |
| 2016/0119053 A1* | 4/2016 | Pescod | H04B 7/18504 455/431 |
| 2016/0214734 A1* | 7/2016 | Pescod | H04B 7/18506 |

FOREIGN PATENT DOCUMENTS

| | | |
|---|---|---|
| WO | 2011017812 A1 | 2/2001 |
| WO | 2013017844 A1 | 2/2013 |
| WO | 2014188179 A1 | 11/2014 |
| WO | 2014188180 A1 | 11/2014 |
| WO | 2014188181 A1 | 11/2014 |

OTHER PUBLICATIONS

GB Intellectual Property Office Search Report under Section 17(5) received for GB Patent Application No. 1309296.0 dated Nov. 20, 2013. 3 pages.
Extended European Search Report received for EP Patent Application No. 13250060.4 dated Apr. 14, 2014. 7 pages.
International Search Report and Written Opinion received for Patent Application No. PCT/GB2014/051550, dated Aug. 11, 2014. 9 pages.
GB Intellectual Property Office Search Report under Section 17(5) received for GB Patent Application No. 1309288.7 dated Nov. 21, 2013. 3 pages.
Extended European Search Report received for EP Patent Application No. 13250059.6 dated Apr. 17, 2014. 7 pages.
International Search Report and Written Opinion received for Patent Application No. PCT/GB2014/051549, dated Jul. 17, 2014. 10 pages.
GB Intellectual Property Office Search Report under Section 17(5) received for GB Patent Application No. 1309295.2 dated Nov. 21, 2013. 3 pages.
Extended European Search Report received for EP Patent Application No. 13250061.2 dated Apr. 14, 2014. 8 pages.
International Preliminary Report on Patentability received for Patent Application No. PCT/GB2014/051550, dated Dec. 3, 2015. 6 pages.
International Preliminary Report on Patentability received for Patent Application No. PCT/GB2014/051549, dated Dec. 3, 2015. 7 pages.
International Preliminary Report on Patentability received for Patent Application No. PCT/GB2014/051548, dated Dec. 3, 2015. 6 pages.

* cited by examiner

DATA RETRIEVAL SYSTEM IN AN AIRCRAFT WITH DATA STORED DURING A FLIGHT AND WIRELESSLY TRANSMITTED TO A GROUND SYSTEM AFTER LANDING USING A TRANSMISSION ELEMENT IN AN EXTERNAL PANEL OF AN AVIONIC BAY

FIELD OF THE INVENTION

The present invention relates to the retrieval of data stored by an aircraft. The present invention relates in particular to, but is not limited to, retrieval of data acquired and stored by an aircraft during a flight.

BACKGROUND

Conventionally, during a mission, data is acquired (and/or updated) and stored by a military aircraft. In some cases, such data is stored in a storage module in an electromagnetically sealed bay of the military aircraft, with the electromagnetically sealed bay having one or more electromagnetically sealed panels. Conventionally, after one or more missions are completed, the data is retrieved by removing or opening the sealed panel and physically accessing the data storage module, which for example may include physically removing the data storage module, or one or more storage media of a storage module, from the aircraft. Removal and then replacement of the sealed panel can lead to increased turnaround and/or maintenance times.

In the field of civilian aircraft, wireless communication of data between an aircraft and ground side equipment, whilst on the ground, is known. See for example U.S. Pat. No. 7,835,734.

SUMMARY OF THE INVENTION

In a first aspect, the invention provides an aircraft-side aircraft data retrieval system, comprising: a data storage device located in an aircraft adapted to, during a flight, store data acquired during the flight; a transmission element in an external panel of the aircraft; and wireless apparatus adapted to wirelessly transmit, after the aircraft has landed, the stored data to a ground-side data retrieval system via the transmission element.

At least an antenna of the wireless apparatus may be in a bay of the aircraft and the bay may comprise the external panel of the aircraft.

The bay may be an avionics bay of the aircraft.

The bay may be an electromagnetically sealed bay of the aircraft and the seal may comprise the external panel of the aircraft.

The transmission element may be a dielectric filled hole.

The dielectric filling of the dielectric filled hole may be a material with a dielectric constant in the range 2.1 to 2.36.

The dielectric filled hole may be in a bolt that is in the external panel.

The transmission element may be a coaxial transmission line assembly.

The coaxial transmission line assembly may comprise a bolt made of a conducting material.

The wireless apparatus may be adapted to wirelessly transmit, after the aircraft has landed, the stored data to a ground-side data retrieval system at a frequency in a range selected from the following ranges: (i) 50-330 GHz, (ii) 22-24 GHz.

In a further aspect, the invention provides a ground-side aircraft data retrieval system, comprising: wireless apparatus adapted to wirelessly receive data acquired and stored by the aircraft during flight and transmitted via a transmission element after landing by the aircraft, using an aircraft-side data retrieval system according to any of the above aspects.

The ground-side aircraft data retrieval system may be located in a hand-held terminal.

The ground-side aircraft data retrieval system may further comprise an antenna probe head arrangement adapted to capture the wireless transmission from the transmission element.

In a further aspect, the invention provides an aircraft-side aircraft data retrieval method, comprising: during a flight by an aircraft, storing data acquired during the flight in a storage device located in the aircraft; and after the aircraft has landed, wirelessly transmitting the stored data to a ground-side data retrieval system via a transmission element in an external panel of the aircraft.

In a further aspect, the invention provides an aircraft data retrieval method, comprising: performing an aircraft-side aircraft data retrieval method according to the above aspect; and wirelessly receiving stored data transmitted during the performance of the aircraft-side aircraft data retrieval method.

The system may be for use on a military aircraft and as such the data storage device may be located in a first location on a military aircraft

DETAILED DESCRIPTION

Figure 1:
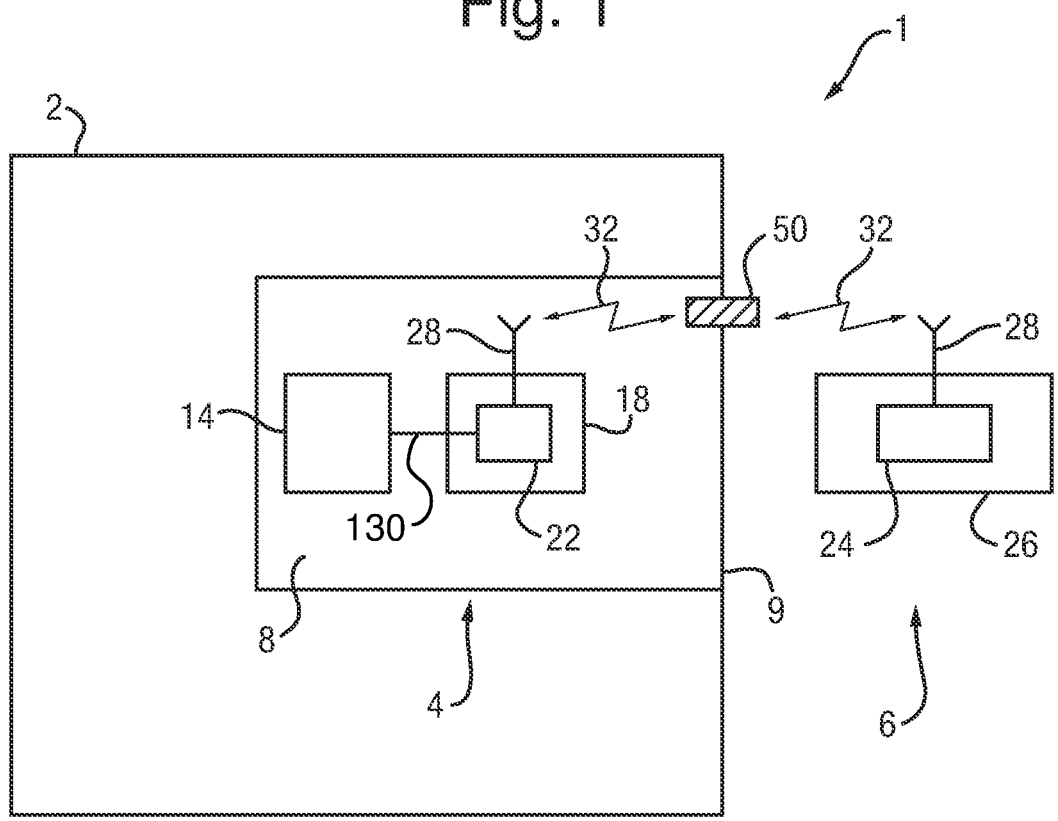
FIG. 1 is a schematic block diagram of an embodiment of a data retrieval system for use with a military aircraft.

FIG. 1 is a schematic block diagram of an embodiment of a data retrieval system 1 for use with a military aircraft 2.

In this embodiment the data retrieval system 1 comprises an aircraft-side data retrieval system 4 and a ground side data retrieval system 6. The aircraft 2 comprises a bay 8. As will be described below, the data to be retrieved is stored in the bay 8. The bay 8 comprises an external aircraft panel 9 that is electromagnetically sealed. By way of example, in this particular embodiment the bay 8 is an avionics bay 8.

In this embodiment the aircraft-side data retrieval system 4 comprises a data storage module 14 and an aircraft wireless system 18, both of which are located in the avionics bay 8. The aircraft wireless system 18 comprises an aircraft-ground link module 22.

In this embodiment the ground side data retrieval system 6 comprises a ground side wireless system 24 located in a hand-held terminal 26.

In this embodiment, each of the aircraft-ground link module 22 and the ground side wireless system 24 comprises a respective antenna 28.

In this embodiment the data storage module 14 is operably coupled via a hard-wired link 130 to the aircraft-ground link module 22. A data retrieval system wireless link 32 is provided between the aircraft-ground link module 22, via its antenna 28, and the ground side wireless system 24 (in particular its antenna 28). In this embodiment the data retrieval system wireless link 32 operates at a frequency of approximately 60 GHz, although this need not be the case in other embodiments.

In this embodiment, in order to allow the data retrieval system wireless link 32 to be provided between the aircraft-ground link module 22 and the ground side wireless system 24, despite the presence of the electromagnetically sealed external aircraft panel 9 of the avionics bay 8, a transmission element 50 is provided in the electromagnetically sealed external aircraft panel 9 of the avionics bay 8. Preferably the transmission element 50 is aligned with the antenna 28 of the aircraft-ground link module 22. Further details of the transmission element 50 will be described later below with reference to FIGS. 3 and 4.

The above arrangement is described in more detail as follows.

In this embodiment, data is acquired on the aircraft during a flight and stored at the data storage module 14. The data storage module 14 may be implemented in any conventional fashion, including one or more processors and one or more storage media. Additionally, in this embodiment, the data storage module 14 comprises a conventional input and output arrangement.

In conventional arrangements, after the aircraft lands after a mission, the avionics bay 8 would be opened and a conventional data storage module would be physically coupled using an Ethernet digital cable connection to a ground side data retrieval system. In contrast, in this embodiment, the data is retrieved from the data storage module 14 via the hard-wired link 130 and the data retrieval system wireless link 32.

In operation, data acquired or updated during the flight is stored at the data storage module 14. After the aircraft 2 has landed, the hand held terminal is brought into a position that allows adequate wireless transmission/reception between the aircraft-ground link module 22 and the ground side wireless system 24 (via the transmission element 50). Since in this embodiment the wireless frequency employed is approximately 60 GHz, this range is about 5 meters maximum. This provides good security against eavesdropping. Operation over a larger separation between the avionics bay 8 and the hand held terminal 26 is also possible, but this will increase the probability of detection of the wireless data remote from the aircraft.

An advantage that tends to be provided by virtue of the data retrieval system 1 is that there is no need to open any panel of the aircraft just for the sake of allowing wireless connectivity on the ground, since the transmission element allows completion of the data retrieval wireless link through the electromagnetically sealed external aircraft panel 9 of the avionics bay 8. In other embodiments the panel 9 does not fully electromagnetically seal the bay 8, nevertheless the transmission element 50 still provides an advantage of requiring lower power transmission to allow adequate provision of the wireless link compared to if no transmission element 50 were present.

It is noted that the avionics bay 8 does not need to be opened, with consequential delays regarding opening and later re-establishing the electromagnetic sealing, despite this being where the data storage module 14 (and hence the stored data) is located.

Figure 2:
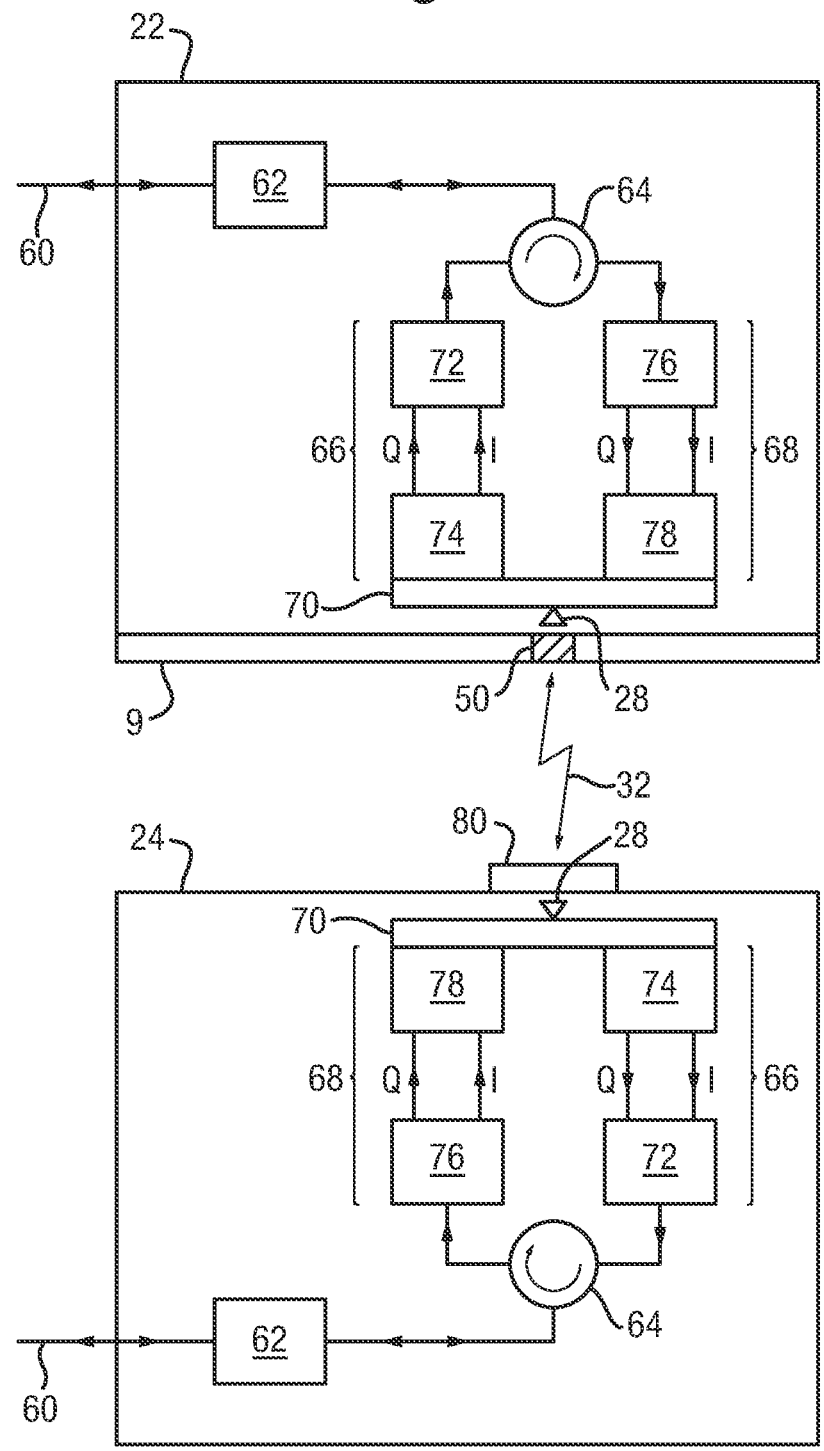
FIG. 2 is a block diagram showing further details of an aircraft-ground link module and a ground side wireless system of the data retrieval system of FIG. 1.

FIG. 2 is a block diagram showing further details of the aircraft-ground link module 22 and the ground side wireless system 24. Where applicable the same reference numerals are used to refer to the same elements as shown in FIG. 1. Also shown in FIG. 2 is the data retrieval system wireless link 32.

In this embodiment the aircraft-ground link module 22 and the ground side wireless system 24 are the same as each other in terms of their electrical elements, as follows. Each comprises a digital input/output 60, a wireless modem 62, a circulator 64, a reception branch 66, a transmission branch 68, a transmission/reception diplexer 70, and an antenna 28 (which in this embodiment is a horn antenna). The reception branch 66 comprises an In-phase and Quadrature (IQ) splitter 72 and a reception module 74 coupled to each other by two separate couplings, one for Q and one for I. The transmission branch 68 comprises an IQ splitter 76 and a transmission module 78 coupled to each other by two separate couplings, one for Q and one for I. A difference between the aircraft-ground link module 22 and the ground side wireless system 24 is that the aircraft-ground link module 22 comprises the transmission element 50 in the electromagnetically sealed panel 9 of the avionics bay 8, whereas the ground side wireless system 24 comprises a conventional window 80 that is transparent to the wireless frequency employed (which in this embodiment is approximately 60 GHz). Preferably, the transmission element 50 is aligned with the antenna 28 of the aircraft-ground link module 22. The material used for the transmission element 50 and the window 80 could be the same material offering low transmission loss at the selected transmission frequency.

In this embodiment the wireless modem 62 operates at a frequency of 2.4 GHz, but other frequencies are possible, one example being in the range 1 to 6 GHz.

The digital input/output 60 is coupled to the wireless modem 62 using an electrical cable connection. The wireless modem 62 is further coupled to the circulator 64. The circulator 64 is further coupled to the reception branch 66 and the transmission branch 68, more particularly to the IQ splitter 72 of the reception branch 66 and to the IQ splitter 76 of the transmission branch 68. The reception branch 66, more particularly the reception module 74 of the reception branch 66, is coupled to the transmission/reception diplexer 70. The transmission branch 68, more particularly the transmission module 78 of the transmission branch 68, is coupled to the transmission/reception diplexer 70. The transmission/reception diplexer 70 is further coupled to the horn antenna 28. Other types of antenna could also be used to provide different beamwidths and antenna gains.

The data retrieval system wireless link 32 is provided between the respective antennas 28 of the aircraft-ground link module 22 and the ground side wireless system 24, including passing through the transmission element 50 in the electromagnetically sealed panel 9 of the avionics bay 8 and the 60 GHz transparent window 80. These allow the 60 GHz signals to pass through the sealed boxes in which 22 and 24 are located in this embodiment.

In this embodiment the digital input/output 60 of the aircraft-ground link module 22 is coupled via the hard-wired link 30 to the digital input/output of the data storage module 14.

In this embodiment the digital input/output 60 of the ground side wireless system 24 is coupled to any suitable end-use arrangement. For example, the digital input/output 60 may be coupled to one or more storage media (not shown) comprised by the hand held terminal 26. The one or more storage media may removable or fixed or one or more of each.

In operation, in this embodiment the each of the aircraft-ground link module 22 and the ground side wireless system 24, and the arrangement of FIG. 2 as a whole, operates as follows.

At the request of the operator in control of the hand held terminal 26, a command is issued on a data terminal connected to the Ethernet digital input/output 60 of the ground side wireless system 24 to download maintenance data from the data storage module 14. This instruction is wirelessly transmitted from the ground side wireless system 24, via the 60 GHz transparent window 80, over the data retrieval system wireless link 32 and via the transmission element 50 to the aircraft-ground link module 22. The wireless signal is demodulated in the wireless modem 62 and connected using the digital input/output interface 60 to the data storage module 14. On reception the data storage module 14 responds to the request to download data and transmits the data to the aircraft-ground link module 22, where the Ethernet data is modulated onto a 60 GHz carrier for transmission over the data retrieval system wireless link 32 to the ground side wireless system 24. The hand held data terminal 26 connected to the Ethernet digital input/output 60 then receives the requested data.

The wireless modems 62 are used to convert the Ethernet digital data on port 60 to a suitable modulation for transmission over the wireless links. Coded Orthogonal Frequency Division Multiplexing modulation and coding is one preferred example, in order to alleviate or minimise the impact of the multiple reflections of the wireless signal 32 encountered in the avionics bay 8.

In all the above embodiments the aircraft-ground link module 22 and the ground side wireless system 24 are of the same type, design and specification as each other. However, this need not be the case, and in other embodiments their types and/or design and/or specifications may be different to each other. In other embodiments even when one or more of these characteristics are the same, they may be different to those described above. Examples of different possibilities include the following.

In the above embodiments the input/output 60 is Ethernet digital signals providing a bi-directional transmission path for both data and handshaking for acknowledging receipt of a data packet. In other embodiments, a simplified single direction transmission system may be implemented with transmission from the data storage module 14 to the hand held terminal 26. The data download transmission would be initiated by a different method (any suitable conventional method) compared to that described above as the initial request from the hand held terminal 26 to the data storage module 14 would not be supported with a uni-directional link.

Further details of the transmission element 50 will now be described with reference to FIGS. 3 and 4.

Figure 3:
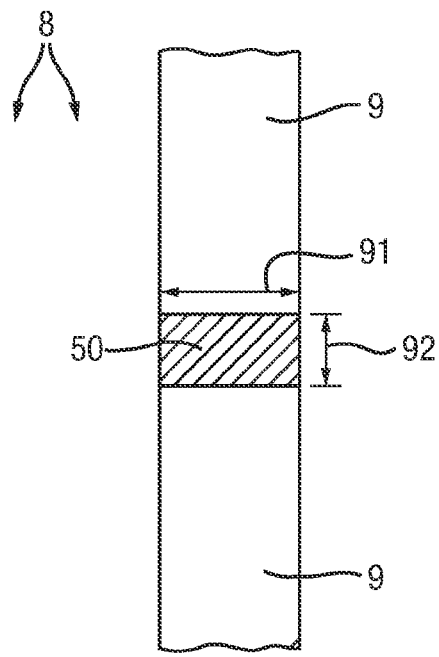
FIG. 3 is a schematic cross-sectional illustration (not to scale) showing details of a transmission element of the aircraft-ground link module of FIG. 2.

FIG. 3 is a schematic cross-sectional illustration (not to scale) showing further details of the transmission element 50 of this embodiment. Where applicable the same reference numerals are used to refer to the same elements as shown in FIGS. 1 and 2. In this embodiment the transmission element 50 is a dielectric filled hole 50. A hollow hole is provided in the electromagnetically sealed panel 9 of the avionics bay 8 by any suitable process. For example an existing panel may have a hole drilled in it as a retro-fit process, or a panel may be initially manufactured with a hole in it. In this embodiment the hole has a circular cross-section, but this need not be the case in other embodiments. The dielectric material fills the hole to provide the dielectric filled hole 50. The dielectric material filling may be provided by any suitable process. For example, a suitable dielectric material may be used to amorphously fill the hole. Another possibility, for example, is that a sub-assembly comprising non-dielectric material with a dielectric filled hole therein may be provided for inserting and filling a larger second hole provided in the panel.

Any suitable dielectric material (with corresponding dielectric constant value) may be used for the filling of the dielectric filled hole 50. For example, a preferred range of dielectric constant values is 2 to 2.4. In this embodiment, the material used in the dielectric filled hole 50 is either polypropropylene or PTFE which have a dielectric constant value of 2.2 to 2.36 and 2.1 respectively.

The dimensions of the dielectric filled hole 50 are preferably selected in terms of satisfying a trade-off between acceptable or desired levels of transmission through the dielectric filled hole 50 of the data download, compared to unduly high leakage through the dielectric filled hole 50 of other signals and frequencies. In this embodiment, the length (Indicated in FIG. 3 by reference numeral 91) of the hole is 10 mm (typical of an avionics bay door 9 thickness) and the diameter (Indicated in FIG. 3 by reference numeral 92) of the hole is 5 mm. An advantage of the use in this embodiment of a frequency of approximately 60 GHz is that for a given performance the dielectric filled hole 50 may be of relatively small diameter 92, i.e. 5 mm being a wavelength at 60 GHz. In particular, a relatively low insertion loss is provided by use of such a small diameter at the frequency of approximately 60 GHz, but lower frequency signals suffer a much bigger insertion loss. For use over the 55 to 65 GHz frequency range a preferred range of the diameter 92 of the dielectric filled hole 50 is 3 mm to 5 mm. At 55 Ghz a circular waveguide has a cut-off diameter of 1.6 mm. Hence for operation at 55 GHz a hole diameter of 3 to 5 mm is one preferred range.

In this embodiment, the length 91 of the dielectric filled hole 50 (and in particular the length 91 of the dielectric filling in any provided initial hole) is the same as the thickness of the electromagnetically sealed panel 9 of the avionics bay 8. However, this need not be the case, and in other embodiments the length 91 of the dielectric filled hole 50 (and in particular the length 91 of the dielectric filling in any provided initial hole) is different to the thickness of the electromagnetically sealed panel 9 of the avionics bay 8.

In further embodiments, the dielectric filled hole 50 is provided as a central part of a modified fixing bolt. In more detail, a fixing bolt used for fixing the electromagnetically sealed panel 9 of the avionics bay 8 to the aircraft 2, for example to an internal metallic bulkhead of the aircraft 2, is modified to have a hollowed out axial core that is then filled with dielectric material to provide the dielectric filled hole when the bolt is bolted through the panel 9 and into the metallic bulkhead. This way of providing the dielectric filled hole avoids the need to add any new holes to the panel 9, and is particularly convenient when providing a retro-fit.

In some circumstances the diameter of an available or desired fixing bolt may lead to the dielectric filled hole not being able to have as large a diameter as desired for the frequency being used, e.g. for operation at 55 GHz or above a hole diameter of greater than 1.6 mm would typically be required. In further embodiments this problem is alleviated by instead implementing the transmission element 50 in the form of a coaxial transmission line assembly 50 that includes the body of a metal (or other conducting material) bolt.

Figure 4:
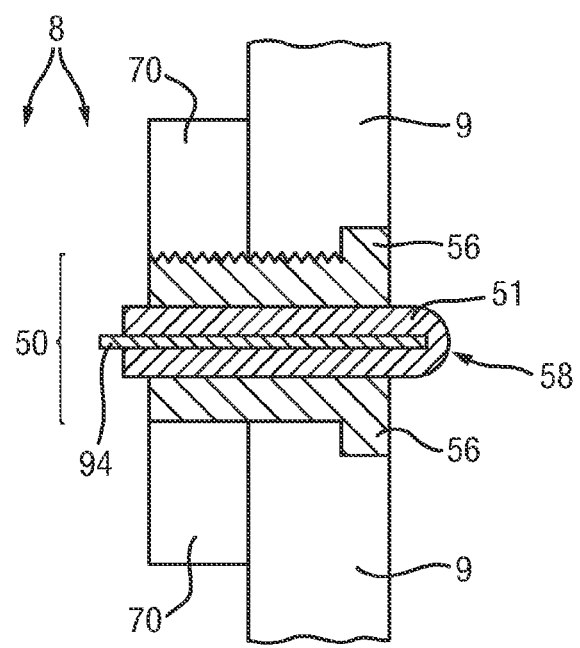
FIG. 4 is a schematic cross-sectional illustration (not to scale) showing details of a further embodiment of a data retrieval system for use with a military aircraft.

FIG. 4 is a schematic cross-sectional illustration (not to scale) showing further details of such a further embodiment (i.e. one where the transmission element 50 is a coaxial transmission line assembly 50). Where applicable the same reference numerals are used to refer to the same elements as shown in FIGS. 1 to 3.

In this embodiment, a fixing bolt 56 is used as one of a plurality of fixing bolts that are used to fix the electromagnetically sealed panel 9 to a metallic bulkhead 70 of the aircraft 2. The fixing bolt 56 has a hollowed out coaxial centre into which is provided a conducting transmission line 94 surrounded by dielectric material sleeve 51. The transmission line 94 is made of a suitable conducting material, for example copper. In this embodiment the dielectric material sleeve 51 is made of PTFE.

In this embodiment, the metallic bulkhead 70 is earthed, and hence in operation the bolt 56 is earthed. The bolt 56, dielectric material 51 and transmission line 94 in combination provide a coaxial transmission line assembly 50.

The coaxial transmission line assembly 50 can be manufactured in any suitable manner. One example is to modify a conventional fixing bolt by drilling out (or otherwise removing) a central part of the bolt diameter and then inserting the dielectric material sleeve 51 and the transmission line 94. Another example is to initially manufacture a bolt with the dielectric material 51 and the transmission line 94 in it to begin with.

The dimensions of the dielectric material sleeve 51 and the transmission line 94, and the dielectric constant of the dielectric material of the dielectric material sleeve 51, are selected to provide a desired transmission line impedance. By way of example, in this embodiment the dimensions and dielectric constant values are: the diameter of the hole in the metal fixing bolt 56 is 3.4 mm, the diameter of the transmission line 94 is 1 mm, and the dielectric material sleeve 51 is made of PTFE with a dielectric constant of 2.1. This provides a transmission line impedance of 50 Ohms.

In this embodiment the end of the transmission line 94 facing the avionics bay 8 is arranged to provide a desired level of coupling by protruding from the end of the bolt 56 and from the end of the dielectric material sleeve 51. However, this need not be the case, and in other embodiments there may be no protrusion, or other arrangements for improving coupling may be provided.

In this embodiment the end of the transmission line 94 external to the aircraft 2 protrudes from the end of the bolt 56 by a length of 1.5 mm, thereby providing (being a quarter wavelength for frequency of 60 GHz) a monopole antenna, thereby providing a wider beamwidth and higher transmission efficiency. However, this need not be the case, and in other embodiments the end of the transmission line 94 external to the aircraft 2 may be arranged differently, for example flush with the head of the bolt 56, thereby advantageously tending to reduce the risk of mechanical damage. Returning to the embodiment shown in FIG. 4, in order to mechanically protect the 1.5 mm of transmission line 94 protruding from the bolt 56, the dielectric material sleeve 51 extends to form a hemispherical dome 58 (or other shaped) protective layer. However, this need not be provided, and in other embodiments no mechanical protection is provided.

Returning to the embodiment of FIG. 3, in yet further embodiments, instead of implementing the transmission element 50 as a dielectric filled hole 50, the transmission element 50 may be implemented as a coaxial transmission line assembly 50 provided in a hole in the electromagnetically sealed panel 9 of the avionics bay 8. In such embodiments, the outer conductor of the coaxial transmission line assembly 50 may be provided by any suitable conducting part, i.e. not necessarily a bolt, that is suitably earthed by some means.

In the above embodiments, relatively narrow beams are emitted from the transmission element 50. Also, the transmission element 50 has relatively small physical areas from where the emission takes place. In further embodiments, this small area is made use of to alleviate any practical disadvantages of narrow beam emissions and/or to reduce the required power transmission levels.

Figure 5:
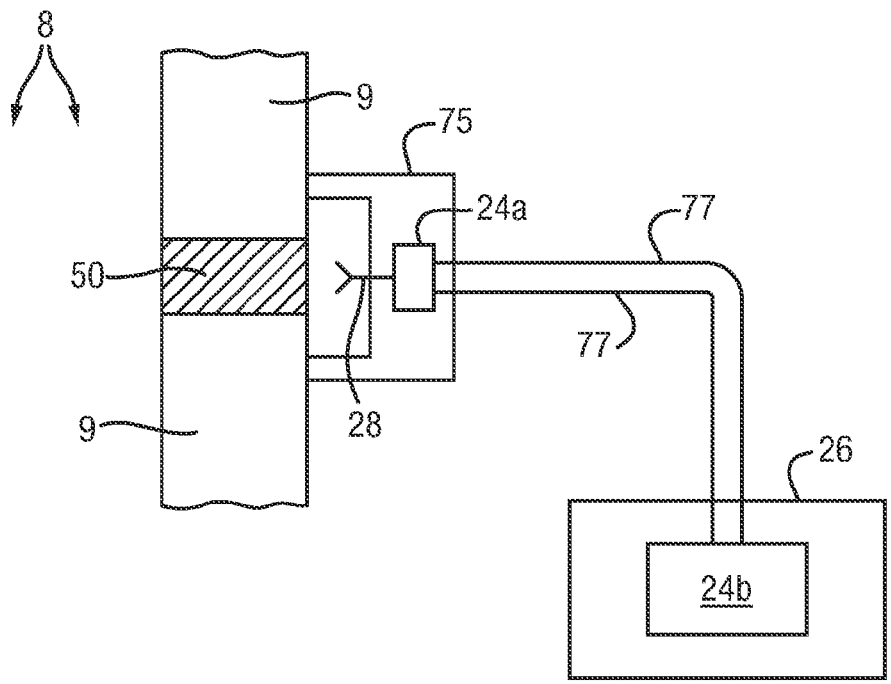
FIG. 5 is a schematic cross-sectional illustration (not to scale) showing details of a further embodiment of a data retrieval system for use with a military aircraft.

FIG. 5 is a schematic cross-sectional illustration (not to scale) showing further details of such a further embodiment. Where applicable the same reference numerals are used to refer to the same elements as shown in FIGS. 1 to 4.

In such further embodiments (see for example FIG. 5), an antenna probe head 75 is provided as part of the ground side data retrieval system 6 to capture emissions from the transmission element 50, by placing the antenna probe head 75 over the end of the transmission element 50. Use of the antenna probe head 75 advantageously captures the emission and does so in a way that does not need careful alignment of direction by an operator. Further details of the antenna probe head 75 of this embodiment are as follows.

The elements and functionality of the ground side wireless system 24 are distributed between a probe head module 24a and a hand held terminal module 24b. The probe head module 24a is located in the antenna probe head 75. The hand held terminal module 24b is located in the hand held terminal 26.

The probe head module 24a includes the antenna 28, the transmission/reception diplexer 70, the reception module 74, and the transmission module 78. The hand held terminal module 24b includes the transmit IQ splitter 76, the receive IQ splitter 72, the circulator 64, the wireless modem 62, and the digital input/output 60. Two coaxial electrical cables 77 are used to operatively couple the probe head module 24a to the lower frequency functions of the hand held terminal module 24b.

It will be appreciated that in other embodiments other antenna probe heads may be used instead, differing over the above described one, for example, as follows. In other embodiments a more compact version of the antenna probe head may include the antenna 28, transmission/reception diplexer 70 and the transmit amplifier of the transmission module 78 and the low noise receive amplifier of the reception module 74. Two coaxial cables or optical fibre link may be used to interface the transmit and receive signals with the other functions of the transmit and receive modules 78 and 74 located in the ground side wireless system 24.

The antenna probe head 75 may be of physical structure that facilitates easy and efficient placement against the outer surface of the panel in which the transmission element 50 is provided. In some further embodiments, this may advantageously include having a structure that enables the antenna probe head 74 to be easily fixed onto and/or held in place on the outer surface of the panel in a desired position, for example by having a suction grip facility. In some further embodiments, additionally or instead, the outer surface of the panel may be provided with a marking or other indication or guide showing an operator where the antenna probe head should be fixed to the aircraft.

In the above embodiments the transmission element 50 is either a dielectric filled hole or a coaxial transmission line assembly. However, in other embodiment, the transmission element may be implemented in other ways, whilst still achieving a tendency to reduce the transmission loss of the wireless signal that would occur due to passing through the electromagnetically sealed panel 9. For example, transmission line embodiments, or embodiments employing a waveguide, may be implemented.

More generally, by use of any of any appropriate arrangements of apparatus, including the different embodiments of apparatus described above and including the options and alternative possibilities discussed in relation thereto, the following embodiment of a data retrieval process may be implemented.

Figure 6:
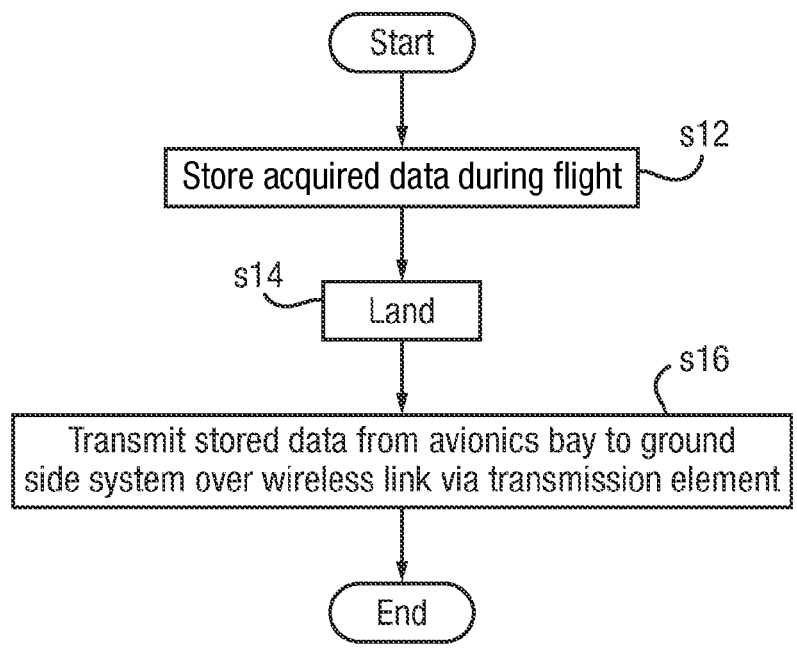
FIG. 6 is a process flowchart showing certain steps of an embodiment of a data retrieval process.

FIG. 6 is a process flowchart showing certain steps of an embodiment of a data retrieval process.

At step s12, acquired data is stored in the avionics bay 8 during flight. In this embodiment the data is stored at the data storage module 14.

At step s14, the aircraft 2 lands.

Thereafter, when the aircraft 2 is stationery, step s16 is performed as follows.

At step s16, the stored data is transmitted via the transmission element 50 over the data retrieval system wireless link 32 from the avionics bay 8 to a ground side system 6. In this embodiment this step is performed by the aircraft wireless system 18 and, as the ground side system, the ground side wireless system 24. However, this need not be the case, and in other embodiments other apparatus may be used.

In other embodiments, step s16 may instead be performed when the aircraft 2 is taxiing, or may instead be performed over a period of time in which for part of that period of time the aircraft 2 is stationery and for part of that period of time the aircraft 2 is taxiing.

In the above embodiments the wireless links are provided at a frequency of approximately 60 GHz, which has a relatively high extent of atmospheric attenuation. A preferred frequency range is 50-70 GHz. A more preferred frequency range is 55-65 GHz.

In other embodiments the frequency may be at other frequency ranges that are not within the range 50-70 GHz, but which are instead in the vicinity of other frequency values that display a relatively high extent of atmospheric attenuation. Preferred ranges include, for example, 22-24 GHz, 110-120 GHz, 170-190 GHz, 310-330 GHz, or more generally 50-330 GHz.

However, the frequency need not be at a value that has a relatively high extent of atmospheric attenuation, and in other embodiments other frequencies outside any of the above mentioned preferred ranges may be used.

When more than one aircraft is to be provided with the above described data retrieval systems 1, then different aircraft may be allocated different frequencies for their respective data retrieval system wireless links. In some embodiments, use of 60 GHz or higher frequencies offers a wide bandwidth so that multiple non interfering channels can be accommodated.

In the above embodiments, during flight, data is stored at the data storage module 14. In other embodiments, other apparatus may be provided in addition to the data storage module 14 and take part in the activity of storing the data. For example, one or more additional processors and/or one or more separate storage media may be used. In yet further embodiments, other apparatus may be used instead of the data storage module, for example other types of processors and/or other separate storage media. In those embodiments where more than one apparatus is used, one or more of them may be located in different parts of the aircraft compared to the others. Indeed, in yet further embodiments, all the relevant apparatus may be located in a region of the aircraft other than a bay or compartment that is electromagnetically sealed in its entirety, for example one that is at least sealed relative to the outside of the aircraft even if not sealed relative to one or more other regions inside the aircraft.

More generally, apparatus, including the systems and modules described above, and other apparatus, including apparatus for implementing the above described processes, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

The invention claimed is:

1. An aircraft-side aircraft data retrieval system, comprising:
   a data storage device located in an aircraft and adapted to, during a flight, store data acquired during the flight;
   a dielectric filled hole passing through an external panel of the aircraft from a first side of the external panel on an interior of the aircraft to a second side of the external panel on an exterior of the aircraft, the external panel electromagnetically sealing a bay within the interior of the aircraft when the external panel is in a closed position; and
   a wireless apparatus adapted to wirelessly transmit, after the aircraft has landed, the stored data from the interior of the aircraft to a ground-side aircraft data retrieval system via the dielectric filled hole, such that the stored data is passed from the electromagnetically sealed bay only through the dielectric filled hole to the ground-side aircraft data retrieval system, with the external panel in the closed position.

2. The aircraft-side aircraft data retrieval system according to claim 1, wherein at least an antenna of the wireless apparatus is in the bay of the aircraft.

3. The aircraft-side aircraft data retrieval system according to claim 2, wherein the bay is an avionics bay of the aircraft.

4. The aircraft-side aircraft data retrieval system according to claim 1, wherein the dielectric filled said hole in the external panel comprises a conductor surrounded by dielectric material.

5. The aircraft-side aircraft data retrieval system according to claim 1, wherein dielectric filling of the dielectric filled hole is a material with a dielectric constant in the range 2.1 to 2.36.

6. The aircraft-side aircraft data retrieval system according to claim 5, wherein the dielectric filled hole is in a bolt that is in the external panel.

7. The aircraft-side aircraft data retrieval system according to claim 1, wherein the dielectric filled said hole comprises a coaxial transmission line assembly.

8. The aircraft-side aircraft data retrieval system according to claim 7, wherein the coaxial transmission line assembly comprises a bolt made of a conducting material.

9. The aircraft-side aircraft data retrieval system according to claim 1, wherein the wireless apparatus is further adapted to wirelessly transmit, after the aircraft has landed, the stored data to the ground-side aircraft data retrieval system at a frequency in a range selected from the following ranges: (i) 50-330 GHz, (ii) 22-24 GHz.

10. The aircraft-side aircraft data retrieval system according to claim 1, wherein the system is for use on a military aircraft and the data storage device is located in a first location on the military aircraft.

11. A system including:
a data storage device located in an aircraft and adapted to, during a flight, store data acquired during the flight;
a dielectric filled hole passing through an external panel of the aircraft from a first side of the external panel on an interior of the aircraft to a second side of the external panel on an exterior of the aircraft, the external panel electromagnetically sealing a bay within the interior of the aircraft when the external panel is in a closed position; and
a first wireless apparatus adapted to wirelessly transmit, after the aircraft has landed, the stored data from the interior of the aircraft to a ground-side aircraft data retrieval system via the dielectric filled hole, such that the stored data is passed from the electromagnetically sealed bay only through the dielectric filled hole to the ground-side aircraft data retrieval system, with the external panel in the closed position;
wherein the ground-side aircraft data retrieval system includes a second wireless apparatus adapted to wirelessly receive the data acquired and stored by the aircraft-side aircraft data retrieval system during the flight and transmitted via the dielectric-filled hole in the external panel after the landing of the aircraft and with the external panel in the closed position.

12. The system according to claim 11, wherein the ground-side aircraft data retrieval system is located in a hand-held terminal.

13. The system according to claim 11, further comprising an antenna probe head arrangement adapted to capture the wireless transmission from the dielectric-filled hole.

14. An aircraft-side aircraft data retrieval method, comprising:
during a flight by an aircraft, storing data acquired during the flight in a storage device located in the aircraft; and
after the aircraft has landed, wirelessly transmitting the stored data to a ground-side aircraft data retrieval system via a dielectric filled hole through an external panel of the aircraft that is accessible from an exterior of the aircraft, such that the stored data is passed only through the dielectric filled hole to the ground-side aircraft data retrieval system when aligned with the dielectric filled hole.

15. A ground-side aircraft data retrieval method comprising the aircraft-side aircraft data retrieval method according to claim 14, further comprising wirelessly receiving, by the ground-side aircraft data retrieval system, the wirelessly transmitted stored data.

16. A ground-side aircraft data retrieval method according to claim 15, wherein the wirelessly receiving of the wirelessly transmitted stored data is carried out at a frequency in a range selected from the following ranges: (i) 50-330 GHz, (ii) 22-24 GHz.

17. The aircraft-side aircraft data retrieval method according to claim 14, wherein the wirelessly transmitting of the stored data to the ground-side aircraft data retrieval system is carried out at a frequency in a range selected from the following ranges: (i) 50-330 GHz, (ii) 22-24 GHz.

* * * * *